(12) United States Patent
Massaro et al.

(10) Patent No.: US 7,225,129 B2
(45) Date of Patent: May 29, 2007

(54) VISUAL DISPLAY METHODS FOR IN COMPUTER-ANIMATED SPEECH PRODUCTION MODELS

(75) Inventors: Dominic W. Massaro, Santa Cruz, CA (US); Michael M. Cohen, Santa Cruz, CA (US); Jonas Beskow, Stockholm (SE)

(73) Assignee: The Regents of the University of California, Oakland, CA (US)

( * ) Notice: Subject to any disclaimer, the term of this patent is extended or adjusted under 35 U.S.C. 154(b) by 1119 days.

(21) Appl. No.: 09/960,248

(22) Filed: Sep. 20, 2001

(65) Prior Publication Data
US 2002/0087329 A1 Jul. 4, 2002

Related U.S. Application Data

(60) Provisional application No. 60/235,410, filed on Sep. 21, 2000.

(51) Int. Cl.
*G10L 13/00* (2006.01)
(52) U.S. Cl. .................. 704/261; 704/270; 345/473
(58) Field of Classification Search ............. None
See application file for complete search history.

(56) References Cited

U.S. PATENT DOCUMENTS

| 4,177,589 A * | 12/1979 | Villa ..................... 704/254 |
| 4,884,972 A | 12/1989 | Gasper |
| 5,613,056 A | 3/1997 | Gasper et al. |
| 5,630,017 A | 5/1997 | Gasper et al. |
| 5,689,618 A | 11/1997 | Gasper et al. |
| 5,826,234 A | 10/1998 | Lyberg |
| 5,880,788 A | 3/1999 | Bregler |
| 5,907,351 A | 5/1999 | Chen et al. |
| 5,933,151 A | 8/1999 | Jayant et al. |
| 5,963,217 A | 10/1999 | Grayson et al. |
| 5,969,721 A | 10/1999 | Chen et al. |
| 5,982,389 A | 11/1999 | Guenter et al. |

(Continued)

OTHER PUBLICATIONS

Cohen, Michael M. and Massano Dominic W.; "Modeling Coarticulation in Synthetic Visual Speech," Models and Techniques in Computer Animation, N.M. Thalmann and D. Thalmann (eds.); pp. 139 thru 156, Springer-Vertag, Tokyo, 1993.

(Continued)

*Primary Examiner*—David D. Knepper
(74) *Attorney, Agent, or Firm*—John P. O'Banion

(57) ABSTRACT

A method of modeling speech distinctions within computer-animated talking heads that utilize the manipulation of speech production articulators for selected speech segments. Graphical representations of voice characteristics and speech production characteristics are generated in response to said speech segment. By way of example, breath images are generated such as particle-cloud images, and particle-stream images to represent the voiced characteristics such as the presence of stops and fricatives, respectively. The coloring on exterior portions of the talking head is displayed in response to selected voice characteristics such as nasality. The external physiology of the talking head is modulated, such as by changing the width and movement of the nose, the position of the eyebrows, and movement of the throat in response to the voiced speech characteristics such as pitch, nasality, and voicebox vibration, respectively. The invention also describes modeling a talking head on the facial image of a particular individual.

17 Claims, 19 Drawing Sheets

U.S. PATENT DOCUMENTS

| | | | |
|---|---|---|---|
| 5,982,390 | A | 11/1999 | Stoneking et al. |
| 5,990,878 | A | 11/1999 | Ikeda et al. |
| 5,995,119 | A * | 11/1999 | Cosatto et al. ............... 345/473 |
| 6,067,095 | A | 5/2000 | Danieli |
| 6,108,012 | A | 8/2000 | Naruki et al. |
| 6,147,692 | A * | 11/2000 | Shaw et al. .................. 345/643 |

OTHER PUBLICATIONS

Garland, Michael and Heckbert, Paul S.; "Surface Simplification Using Quadric Error Metrics," Carnegie Mellon Universit; pp. 1 thru 8; http://www.cs.cmu.edu.; SIGGRAPH, 1997.

Westbury, John R.; "X-Ray Microbeam Speech Production Database User's Handbook," Waisman Center on Mental Retardation & Human Development, Cover Page, Table of Contents and Foreward Page, pp. 1 thru 131, Jun., 1994.

Cole, Ron et al.; "Intelligent Animated Agents for Interactive Language Training," Proceedings of Speech Technology in Language Learning, pp. 1 thru 4, Stockholm, Sweden, 1998.

Stone, Maureen and Lundberg, Andrew; "Three-Dimensional Tongue Surface Shapes of English Consonants and Vowels," Journal of American Acoustical Society, pp. 3728-3737, vol. 99, No. 6, Jun. 1996.

Munhall, K.G. et al., "X-Ray Film Database for Speech Research," Journal of American Acoustical Society, pp. 1222-1224, vol. 98, No. 2, Part 1, Aug. 1995.

Le Goff, Bertrand, "Synthese A Partir Du Texte De Visage 3D Parlant Francais," Doctorate Thesis, pp. 1 thru 253, Oct. 22, 1997.

* cited by examiner

| Rings | Rays | Cloud | Nose | Neck Vibe | Classic | Triangles | X-Ray | Fan | Tongue |

☑ ACTIVATE  Feature: ○Nasality  ●Frication  ○Voicing  ○Plosive

| | |
|---|---|
| ZLength | 0.65 |
| Spread | 0.61 |
| Z | 0.16 |
| Compactness Width Scaling | 0.50 |
| Particle speed | 0.06 |
| Particle number | 1.00 |
| Particle mix | 0.00 |
| Particle angle | 0.25 |
| Particle initial distance | 0.16 |
| Static f0 | 0.13 |
| Noise weight | 1.00 |
| Theta weight | 0.00 |
| Phi weight | 1.00 |
| Rotation | 0.50 |

Amplitude Length: ☑
Affricate Advancement Speed Match: ☑
Color: ☑
Amplitude Width: ☑
Particle Mode: ☐
Nonlinear Width Function: ☑
Compactness Width Function: ☑
Physics Mode: ☑
f0 modulation: ☐
Use static f0: ☑
Strn>Lumi: ☑

FIG. 18

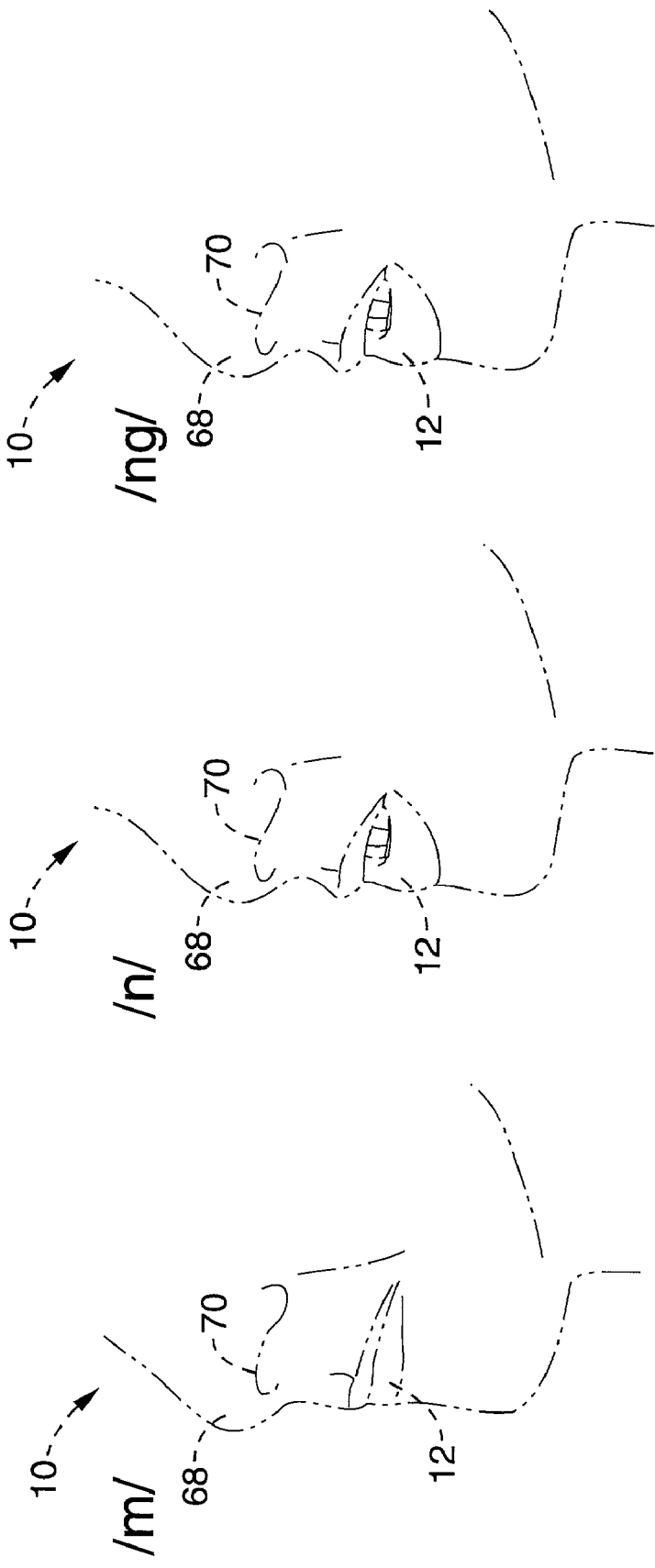

VISUAL DISPLAY METHODS FOR IN COMPUTER-ANIMATED SPEECH PRODUCTION MODELS

CROSS-REFERENCE TO RELATED APPLICATIONS

This application claims priority from U.S. provisional application Ser. No. 60/235,410, filed on Sep. 21, 2000 which is incorporated herein by reference.

REFERENCE TO A COMPUTER PROGRAM APPENDIX

Not Applicable

STATEMENT REGARDING FEDERALLY SPONSORED RESEARCH OR DEVELOPMENT

This invention was made with Government support under Grant No. DC00236, awarded by the National Institutes of Health, and Grant No. 9726363, awarded by the National Science Foundation. The Government has certain rights in this invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The invention generally pertains to the visual modeling of speech, and more particularly to supplemental displays and advanced visualization modes for use with a computer-animated "talking head", and other similar forms of computerized speech modeling which provide a visual component.

2. Description of the Background Art

Visual speech synthesis provides for the visual display of articulators used in the production of speech. Visual speech synthesis has been applied to a number of applications, such as speech therapy, teaching of the hearing-impaired, and realistic facial animations. One preferred method of providing visual speech synthesis is with computer-animated talking heads. These talking heads typically provide a three-dimensional rendering of a generic canonical face whose movements are synthesized in synchronization with a segment of speech so that facial movements and positioning may be associated with the speech being produced. The underlying model for generating the facial features of the talking head typically rely upon modeling the underlying muscles within the head, or the relative movements of the skin on the model. When utilized for teaching speech production articulation, the facial movements are associated with the generated speech. It will be appreciated therefore, that aspects of speech production may prove difficult to comprehend and reproduce given the limited information available from the visual information provided by a conventional talking head. In particular, many of the facial movements can be ambiguous when viewed from the conventional talking head representation, for example, the production of the initial sounds in "bee", "pea", and "me" in the bilabial viseme category. It should be further appreciated that a hearing loss would further compromise the ability of an individual to discern the use of various speech production articulators.

Therefore, a need exists for a talking head that simplifies discerning the use of speech production articulators to reproduce a given segment of speech. The present invention satisfies those needs, as well as others, and overcomes the deficiencies of previously developed talking head models.

BRIEF SUMMARY OF THE INVENTION

The present invention provides methods of advanced visualization and supplementary displays for displaying speech production articulators within computer-animated talking heads. The inventive methods are preferably implemented as software routines which execute on a computer, such as a personal computer, which is configured to display a talking head in response to selected segments of speech. One set of advanced visualization features within the invention provide for the direct display of speech characteristics by displaying graphic elements external to the talking head, such as breath images which are preferably shown emanating from the mouth of the talking head. These additional graphic elements represent voice characteristics such as nasality, frication, voicing, and plosion in relation to the given segment of speech being reproduced to eliminate ambiguity with regard to the presence or absence of these characteristics. In addition, the presence of voice vibration, spectral spread, and acoustical energy may represented as aspects of the graphical elements. The selected voice characteristics of said speech are represented by augmenting the display of the talking head with additional easily discernable indicators.

By way of example, the mouth of the talking head can be shown emitting particle-cloud images in response to a given voiced characteristic, such as plosion which may comprise stop consonants. The particle-cloud images may be modified by changing the shape, number, or position of the clouds to indicate, for instance, the differences between different stop consonants such as labial stops, alveolar stops, velar stops, and non-voiced versus voiced consonants. Another form of visual display augmentation is provided by particle-stream images which are also preferably displayed as emanating from the mouth of the talking head. The particle-stream images represent one or more voice characteristics of speech, such as the production of fricatives. In addition, the particle-stream images may be modified to render additional voice characterization data. For example, striated bands within the particle-streams can represent vocal cord vibrations within the speech segment. The amount of contrast displayed for the particles of the particle-stream against the background can provide an indication of the amount of fricative energy within the speech segment. In addition, the angular dispersion of the particle-stream can be indicative of the spectral spread of the acoustical energy for the voiced segment of speech. The particle-cloud and particle-stream images may utilize colors to discern one or more voiced characteristics, for instance voicing. Furthermore, positioning of the particle-cloud and particle-stream images can convey additional characterization data about the voiced speech. Additional forms of external visual augmentation may be provided on the talking head, such as the use of images proximal to the throat to represent voicebox vibration, the use of images proximal to the nose to indicate nasality, and the use of a movable graphic element positioned on a bar to represent pitch.

Visual representation of speech production in the talking head may be further enhanced by altering aspects of the way in which the talking head is displayed. For example, the width of the nose may be modulated to represent nasality changes, and the eyebrows can be raised or lowered to represent pitch. Furthermore, important aspects of speech articulation may be more clearly viewed by enhancing the views available for the talking head. For example, cutaway and transparent views of the talking head allow for improved viewing of the relative shape of the tongue and its position in relation to the palate and teeth. The elements, such as the tongue, may be highlighted to enhance viewing, while contact points between the tongue and palate or teeth are preferably highlighted so as to increase accurate recognition of the positioning that is required to generate the given speech segment.

In certain applications it is beneficial to have the ability to adapt the canonical shape of the talking head to match a desired shape, or a particular individual. The present invention includes methods for reshaping the talking head to match a target facial model. The method utilizes a form of morphing to fill the target head with the altered talking head frame.

An object of the invention is to reduce the ambiguity in the use of speech production articulators within a given segment of speech.

Another object of the invention is to enhance the discernable speech production articulators within a computer-animated talking head.

Another object of the invention is to provide enhanced methods of displaying nasality, frication, voicing, and plosion within a computer-animated talking head.

Another object of the invention is to provide enhanced methods of displaying vocal cord vibration, acoustical energy, and spectral spread within a voiced segment of speech.

Another object of the invention is to utilize shading and/or color to enhance the clarity of selected voice characteristics of speech.

Another object of the invention is to utilize graphic images rendered outside of the talking head, such as those displayed as emanating from the mouth of said talking head, to represent voice characteristics of said speech.

Another object of the invention is to enhance facial representations within talking head speech models wherein selected speech characteristics may be more readily discerned.

Another object of the invention is to provide enhanced viewing modes for talking heads wherein the proper relationships between the tongue, teeth, and palate regions are easily discerned.

Another object of the invention is to provide a method of altering a canonical talking head to match the features of a particular target head, such as of a given individual.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 18 is a screen menu exemplifying parameter selection for the particle-stream images, such as shown in FIG. 8 through FIG. 17, according to an aspect of the present invention.

FIG. 19 is a side view of a talking head representing nasality according to an aspect of the present invention, shown such as in the speech segment /m/.

FIG. 20 is a side view of a talking head representing nasality according to an aspect of the present invention, shown with nose widening such as found in the speech segment /n/.

FIG. 21 is a side view of a talking head representing nasality according to an aspect of the present invention, shown with nose widening such as found in the speech segment /ng/.

DETAILED DESCRIPTION OF THE INVENTION

For illustrative purposes, the present invention will be described with reference to FIG. 1 through FIG. 33. It will be appreciated that the apparatus may vary as to configuration and as to details of the parts, and that the method may vary as to the specific steps and sequence, without departing from the basic concepts as disclosed herein.

FIG. 1 through FIG. 6 illustrate a portion of a computer-animating talking head speech production model 10 which is shown in the process of pronouncing a given segment of speech. Appearing to emanate from the mouth 12 of the talking head are particle-cloud images which are utilized to represent the presence of a particular voice characteristic of the speech segment being articulated. These particle-cloud image representations can be displayed as moving outwardly from the mouth of the talking head as circular, oval, or lenticular image regions as the articulation of speech continues. In the present embodiment, the particle-clouds are utilized to represent plosion such as stop consonants within the portion of speech being illustrated by the talking head. However, it should be appreciated that the particle-clouds may be utilized to represent a number of voice characteristics without departing from the teachings of the present invention. The coloring of the particle-cloud image is preferably modulated in response to voicing and the particle contrast within the cloud is preferably modulated in response to the energy contained therein. A number of styles of particle-clouds may be displayed to convey additional voice characteristics.

Figure 3:
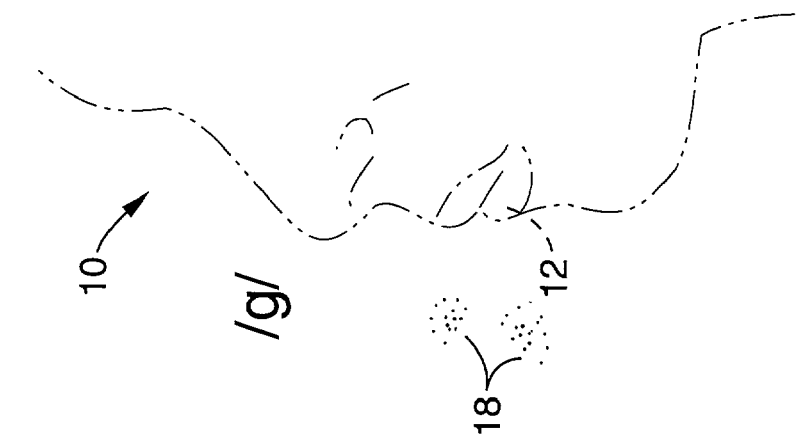
FIG. 3 is a side view of a talking head displaying a double particle-cloud image according to an aspect of the present invention, which may represent a velar stop within the speech segment /g/.
Figure 2:
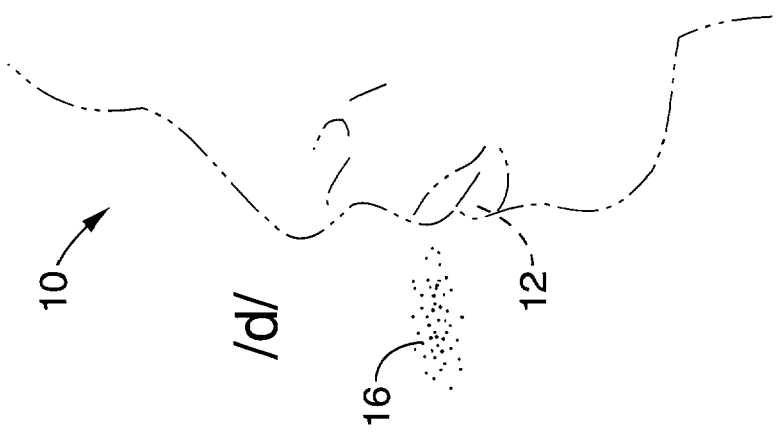
FIG. 2 is a side view of a talking head displaying an elongated single particle-cloud image according to an aspect of the present invention, which may represent an alveolar stop within the speech segment /d/.
Figure 1:
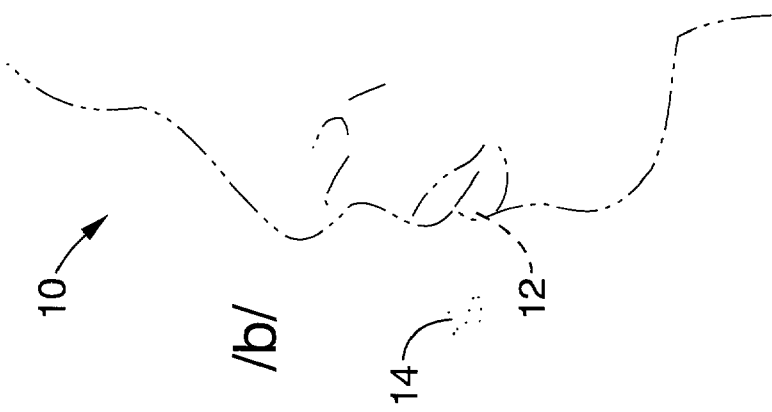
FIG. 1 is a side view of a talking head displaying a single particle-cloud image according to an aspect of the present invention, which may represent a labial stop within the speech segment /b/.
Figure 6:
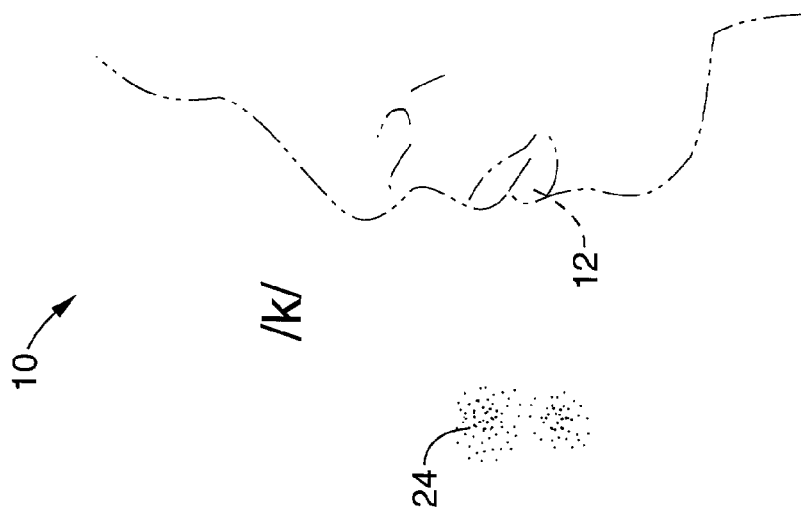
FIG. 6 is a side view of a talking head displaying a double particle-cloud image at a different position than that shown in FIG. 3, which may represent a velar stop within a non-voiced consonant such as /k/.
Figure 5:
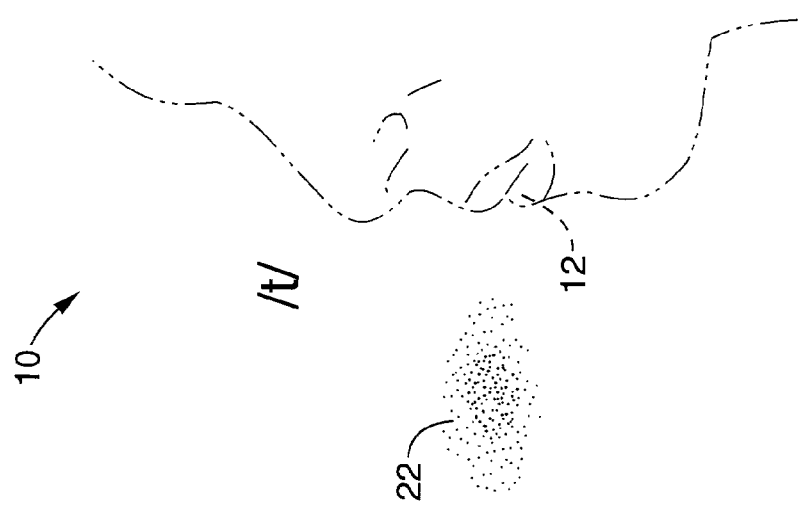
FIG. 5 is a side view of a talking head displaying an elongated single particle-cloud image at a different position than that shown in FIG. 2, which may represent an alveolar stop within a non-voiced consonant such as /t/.
Figure 4:
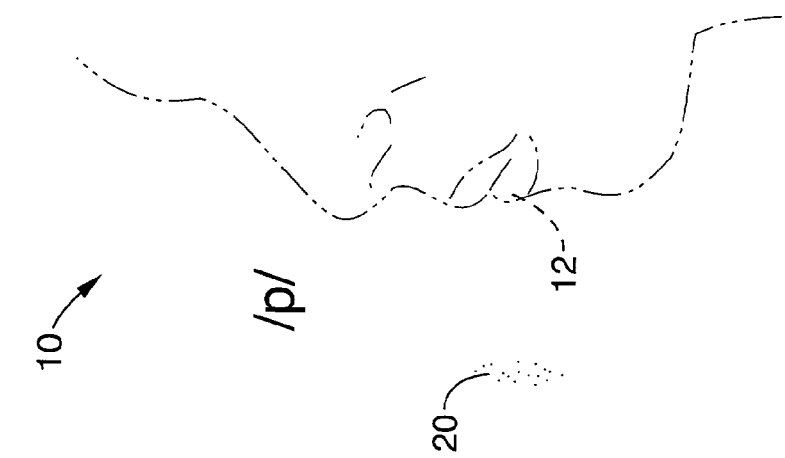
FIG. 4 is a side view of a talking head displaying a single particle-cloud image at a different position than that shown in FIG. 1, which may represent a labial stop within a non-voiced consonant such as /p/.
Figure 7:
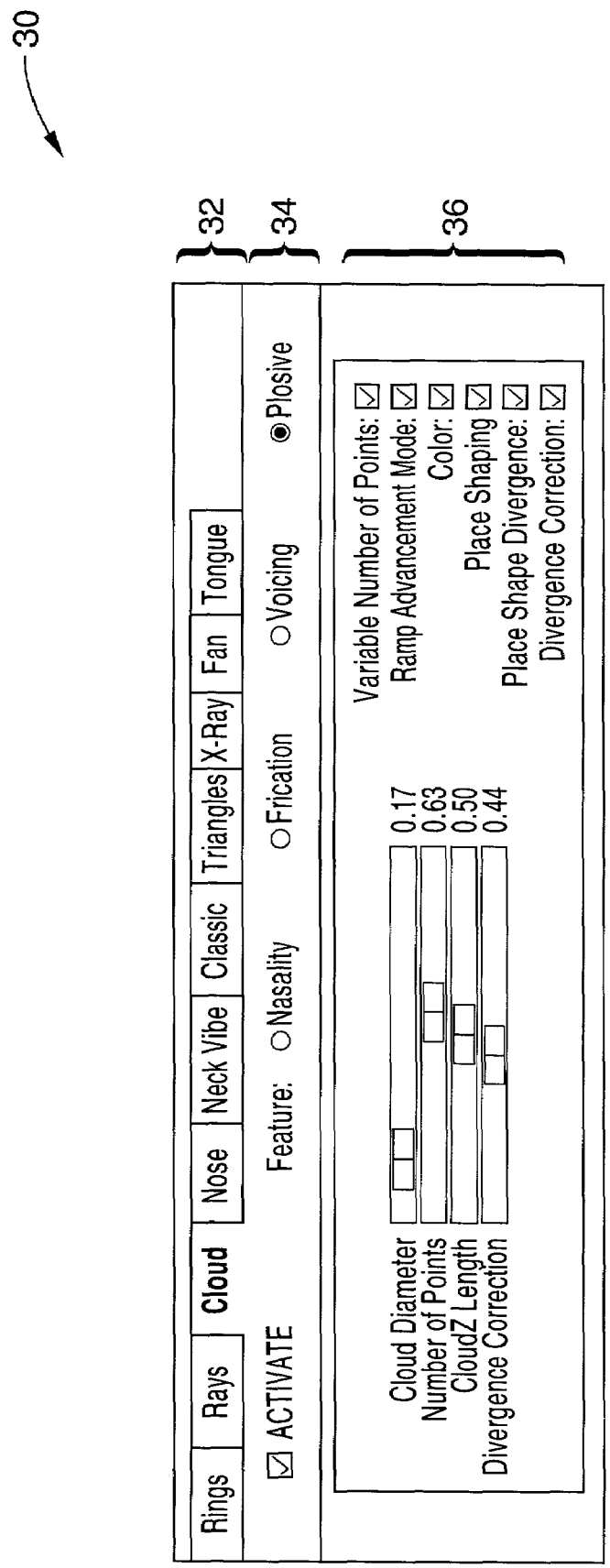
FIG. 7 is a screen menu exemplifying parameter selection for the particle-cloud images, such as shown in FIG. 1 through FIG. 6, according to an aspect of the present invention.

FIG. 1 depicts a small particle-cloud image 14 which represents a voiced labial stop within the speech sound /b/. FIG. 2 exemplifies an elongated single particle-cloud image 16, located in an elevated position from the mouth of said talking head 10, which represents a voiced alveolar stop within the speech sound /d/. FIG. 3 depicts a multiple particle-cloud image 18 with two vertically adjacent particle-cloud images representative of a voiced velar stop within the speech sound /g/. Preferably, FIG. 4 exemplifies a small particle-cloud whose position has been altered in relation to that of FIG. 1 to represent a change in another voice characteristic of the speech segment. In particular, the small particle-cloud 20 of FIG. 4 is shown with extended forward separation from the mouth 12 of said talking head 10 to represent a non-voiced labial stop consonant such as /p/. The increased separation within the particle-cloud representations is intuitive because the non-voiced stop consonants have longer voice onset times than the voiced stop consonants. Similarly, the elongated particle-cloud 22 of FIG. 5 represents a non-voiced alveolar consonant such as /t/, and the double particle-cloud 24 of FIG. 6, represents a non-voiced velar stop consonant such as /k/. It should be appreciated that the particle-cloud may be extended into multiple particle-clouds which may be preferably vertically stacked. It should also be appreciated that additional voice characteristics may be represented within the particle-clouds by modulating the color, position, density, and intensity of the particle cloud images. In particular the exemplified embodiment represents voicing of the speech segment by the color being displayed.

Each of the representations in FIG. 1 through FIG. 6 illustrate speech production articulation sometime after the consonant has been released and the talking head is transitioning to the subsequent vowel sound /u/. Control is preferably provided for particle-cloud image display with a menu 30, such as exemplified in FIG. 7. It will be appreciated that visual characteristics of the particle-cloud may be modified using the selections within menu 30 which illustrate three layers of controls. A section of tabs 32 are shown for selecting the particular image type to be altered, such as the selected tab "clouds". The voice characteristic feature associated with the given image type is shown in section 34 as plosive, and the parameters for controlling the display of the image are represented in section 36.

Figure 8:
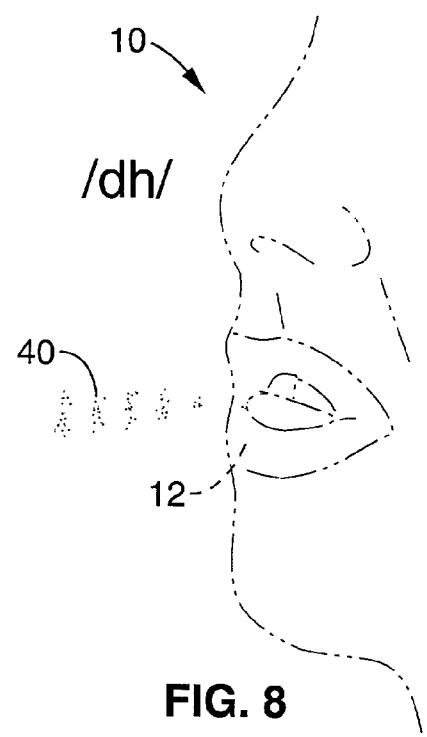
FIG. 8 is a side view of a talking head displaying a particle-stream image according to an aspect of the present invention, which may represent a fricative showing vertical striations for vocal cord vibration such as found in the speech segment /dh/.
Figure 9:
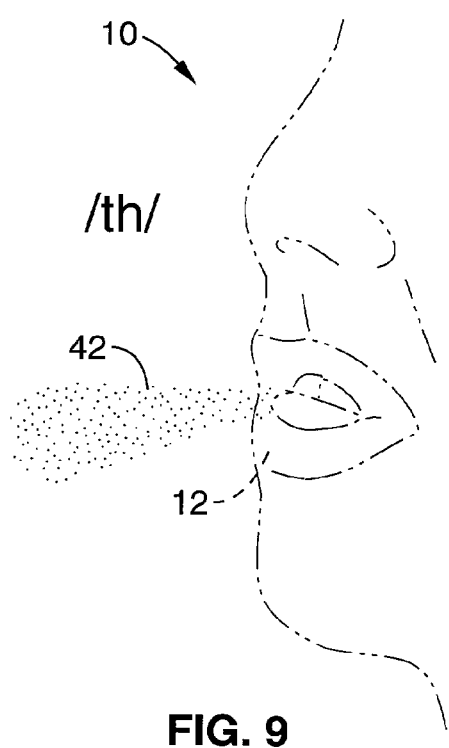
FIG. 9 is a side view of a talking head displaying a particle-stream image according to an aspect of the present invention, which may represent a fricative such as found in the speech segment /th/.
Figure 10:
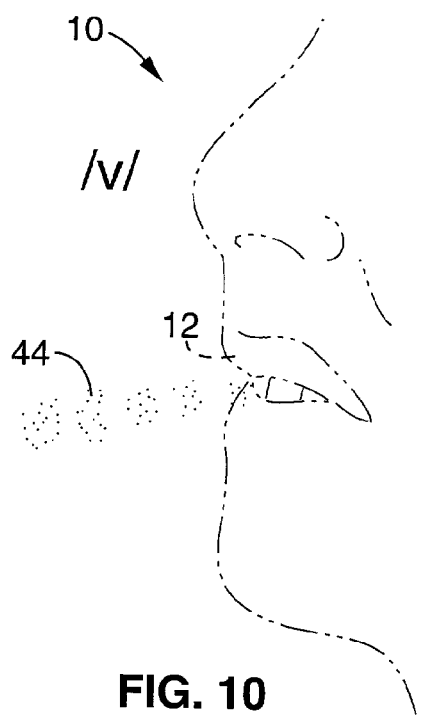
FIG. 10 is a side view of a talking head displaying a particle-stream image according to an aspect of the present invention, which may represent a fricative such as found in the speech segment /v/.
Figure 11:
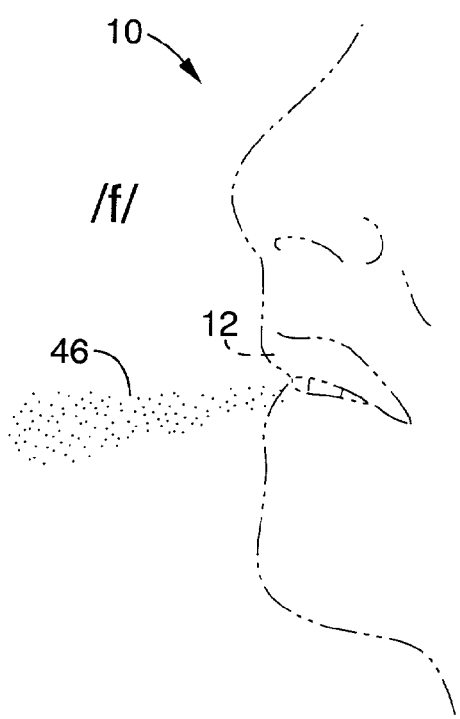
FIG. 11 is a side view of a talking head displaying a particle-stream image according to an aspect of the present invention, which may represent a fricative such as found in the speech segment /f/.
Figure 12:
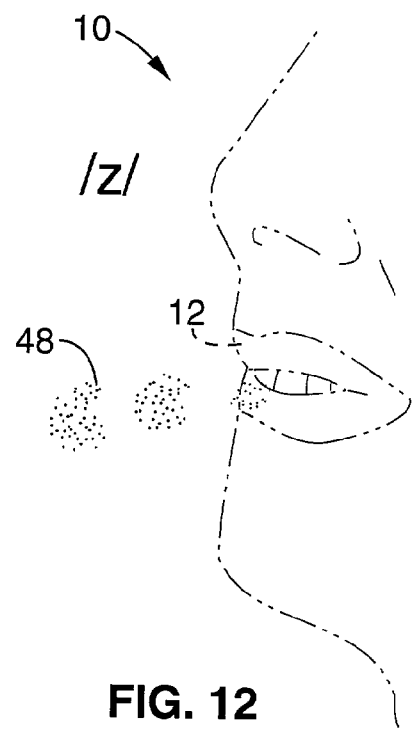
FIG. 12 is a side view of a talking head displaying a particle-stream image according to an aspect of the present invention, which may represent a fricative such as found in the speech segment /z/.
Figure 13:
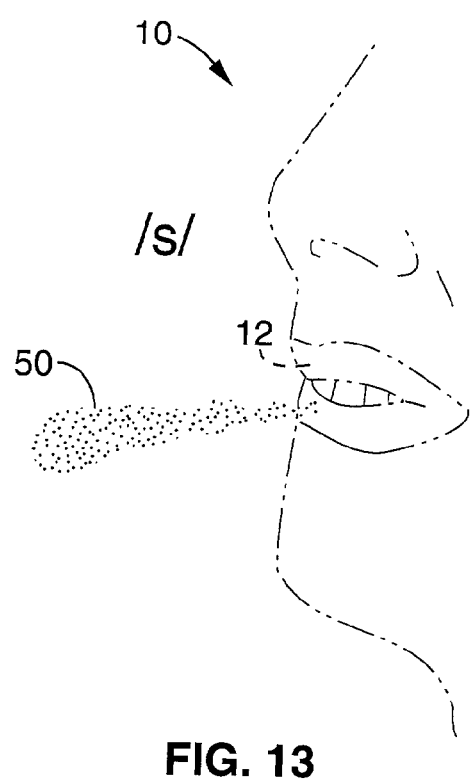
FIG. 13 is a side view of a talking head displaying a particle-stream image according to an aspect of the present invention, which may represent a fricative such as found in the speech segment /s/.
Figure 14:
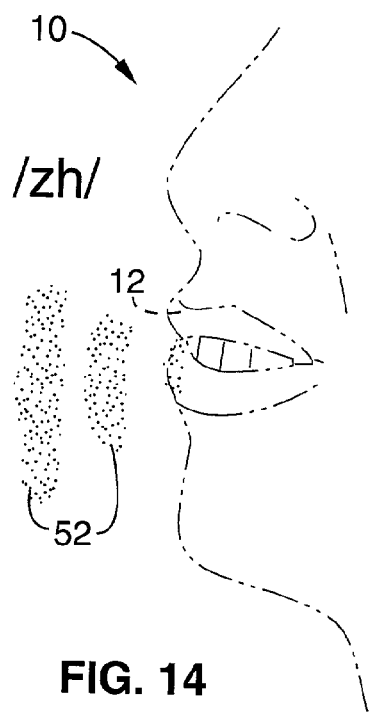
FIG. 14 is a side view of a talking head displaying a particle-stream image according to an aspect of the present invention, which may represent a fricative with a wide spectral spread such as found in the speech segment /zh/.
Figure 15:
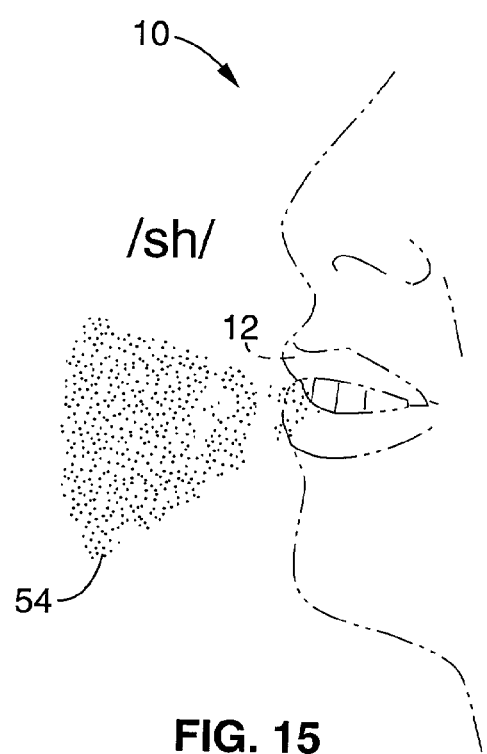
FIG. 15 is a side view of a talking head displaying a particle-stream image according to an aspect of the present invention, which may represent a fricative with a wide spectral spread such as found in the speech segment /sh/.
Figure 17:
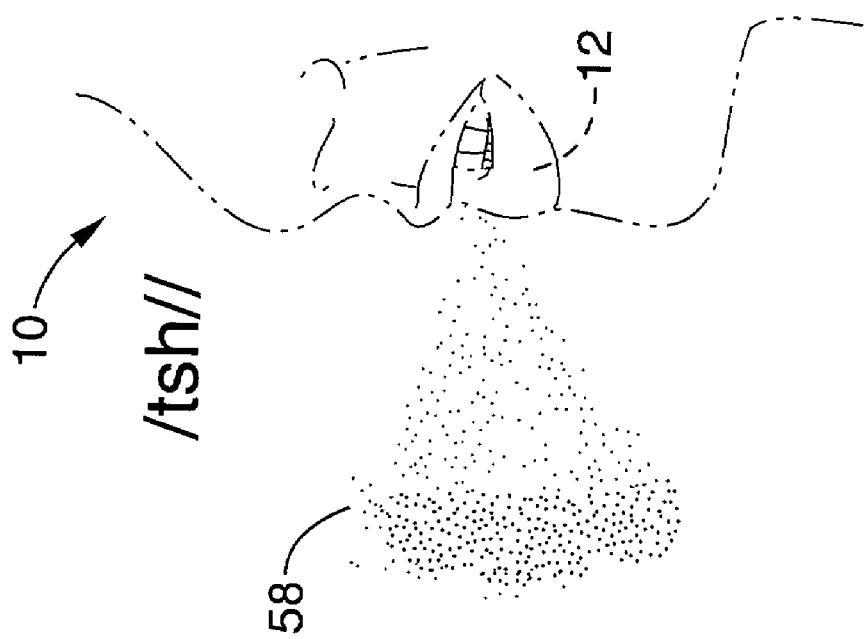
FIG. 17 is a side view of a talking head displaying a particle-stream image according to an aspect of the present invention, which may represent an affricative with a wide spectral spread such as found in the speech segment /tsh//.
Figure 16:
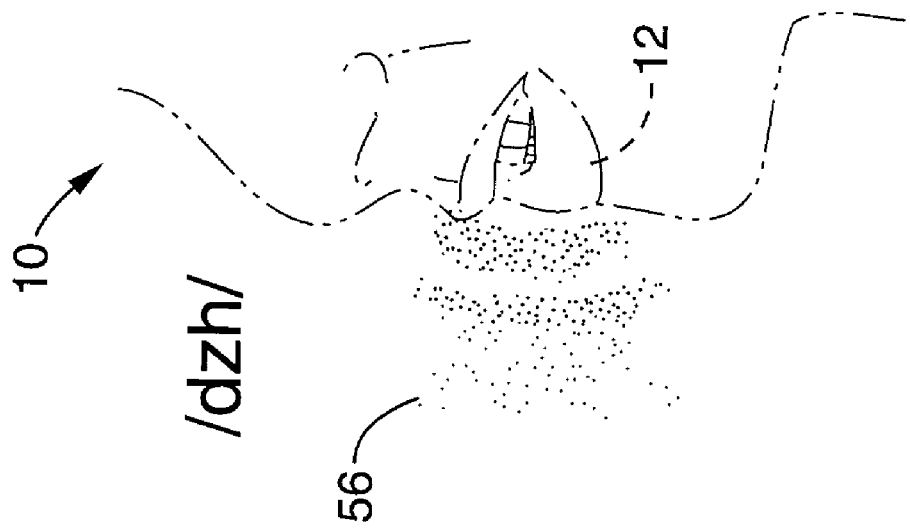
FIG. 16 is a side view of a talking head displaying a transition between and particle-cloud image and particle-stream image according to an aspect of the present invention, which may represent an affricate with a wide spectral spread such as found in the speech segment /dzh/.

FIG. 8 through FIG. 15 illustrate a portion of a computer-animating talking head speech production model 10 wherein particle-stream images appear to emanate from mouth 12 of talking head 10, to represent the presence of a particular voice characteristic of the speech segment. These particle-stream images can be represented as having outward movement from the mouth of the talking head. In the present embodiment, the particle-streams are utilized to represent frication within the portion of speech being illustrated by the talking head. However, it should be appreciated that the particle-streams may be utilized to represent a number of voice characteristics without departing from the teachings of the present invention. The angular dispersion, also referred to as fan width, of the particle-stream that appear to emanate from the mouth of talking head 10 represent the amount of spectral spread for the fricative sound being produced. It will be appreciated, therefore, that a wide fan shaped particle-stream represents a broad-band spectral dispersion of acoustical energy within the spoken segment, while a narrowly dispersed particle-stream represents a narrow band of acoustical energy. In addition, the particle-stream may comprise striations to represent vocal cord vibration, or equivalent voice characteristics. In the same manner as particle-cloud images, the coloring of the image is preferably modulated in response to voicing, and particle contrast within the image is preferably modulated in response to the acoustical energy contained therein. A number of styles of particle-streams are exemplified in the particle-stream figures. FIG. 8 depicts a vertically striated narrow angular dispersion particle stream 40 representing vocal cord vibrations and narrow band energy within the fricative such as found in the sound /dh/. FIG. 9 depicts a non-striated particle-stream image 42 representing frication within a sound such as /th/. FIG. 10 depicts a striated narrow fan particle-stream image 44 representing vocal cord vibration within narrow band frication such as in the sound /v/. FIG. 11 depicts a narrow fan non-striated particle-stream 46 representing a fricative such as in the sound /f/. FIG. 12 depicts an intensely striated particle-stream 48 representing vocal cord vibration and frication within a sound such as /z/. FIG. 13 depicts a non-striated particle-stream 50 representing frication within a sound /s/ such as in the letter "s". FIG. 14 depicts a widely fanned particle-stream 52 with broad, widely separated, striations which represent a broad-band acoustical energy spread and high levels of vocal cord vibration within a fricative such as in the sound /zh/. FIG. 15 depicts a widely fanned particle-stream 54 without striations which represents a fricative with a wide spectral spread such as in the sound /sh/. FIG. 16 and FIG. 17 illustrate the combination of particle-clouds and particle-streams for representing transitional voice characteristics, such as found within speech segments containing affricates. Affricates are represented as the combination of a stop release depicted as a particle-cloud followed by a fricative as depicted by a particle-stream. FIG. 16 illustrates an affricate associated with the sound /dzh/, such as in judge, in which a broad fan 56 represents the broad band of acoustical energy generated and the vertical striations indicate the presence of vocal cord vibration. The transition between the particle-cloud and particle-stream can be seen in the figure. FIG. 17 illustrates transitional image form 58 representing an affricate such as the sound /tsh//, such as in church. Preferably, the aspects of particle-stream display may be selected for use within the system, such as selected within one or more menus. FIG. 18 illustrates a menu 60 for controlling image characteristics of the particle-streams, or fans. A tabbed section 62 allows for the selection of image type, such as "fan", which is activated and set to represent frications as depicted in section 64. The parameters for displaying the fan, is controlled by the parameters set within parameter selection area 66. It will be appreciated that a mixture of control types is represented, such as analog sliders, radio-buttons, and checkboxes.

FIG. 19 through FIG. 21 illustrate a method of depicting nasals on the talking head model 10 by widening nose 68 at base 70. It will be appreciated that conventional mouth movement accompanies the nose widening to display the speech production articulation for the given speech segment. The use of nose widening adds a visually differentiable element so that changes in nasality may be readily discerned on the computer-generated talking head. FIG. 19 represents speech production articulation of the sound /m/, while FIG. 20 represents the sound /n/, and FIG. 21 represents the sound /ng/. In addition the nose may be shown to vibrate, such as by twitching the image, or by the addition of movement bars on the background of the talking head along the exterior edges of the nose. The display of the nose features are preferably controlled through a menu, or similar control panel (not shown).

Figure 22:
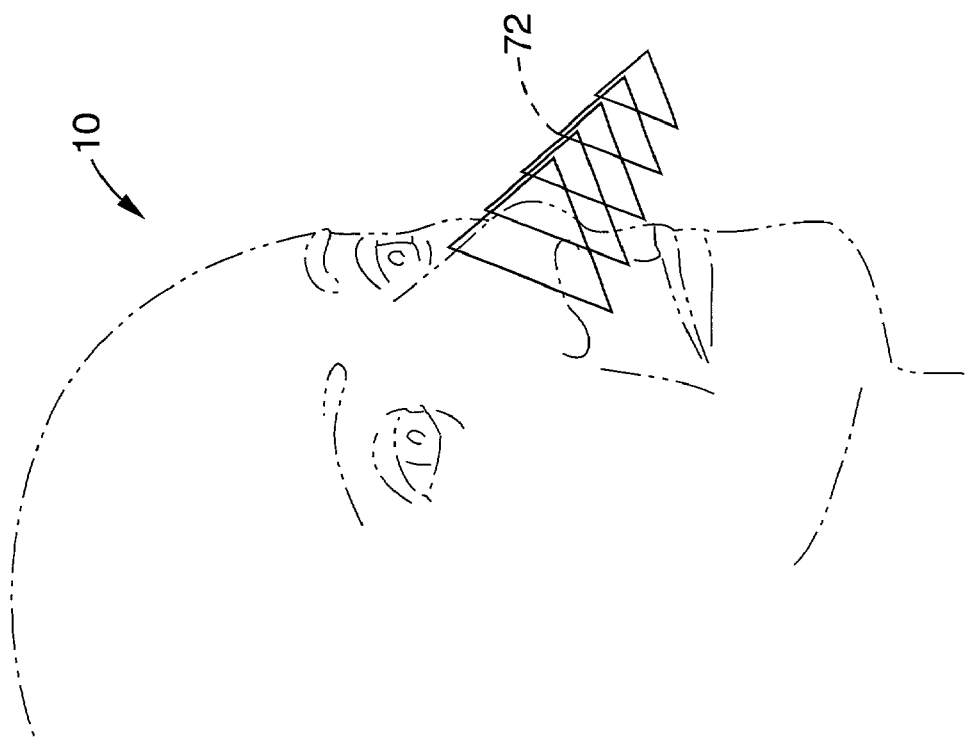
FIG. 22 is a side view of a talking head depicting nasality as concentric triangles according to an aspect of the present invention.

FIG. 22 illustrates an additional method for displaying nasality on talking head 10. Concentric graphic elements 72, such as line graphics, are shown in response to the extent of nasality in the portion of speech being articulated. Triangles were used in this figure due to their intrinsic "nose-shape", which distinguishes them from other elements. The displaying of the concentric triangles is modulated in response to the nasality of the articulated speech segment.

Figure 23:
FIG. 23 is a side view of a talking head representing vocal cord vibrations as concentric rings according to an aspect of the present invention.

FIG. 23 illustrates a method of representing vocal cord, throat vibration, by displaying one or more concentric graphical elements 74 in front of the throat of the talking head. Concentric circles were utilized in the figure, although other shapes could be utilized without departing from the present invention. The displaying of the concentric circles is modulated in response to the voice box vibrations that arise for the articulated speech segment.

Figure 24:
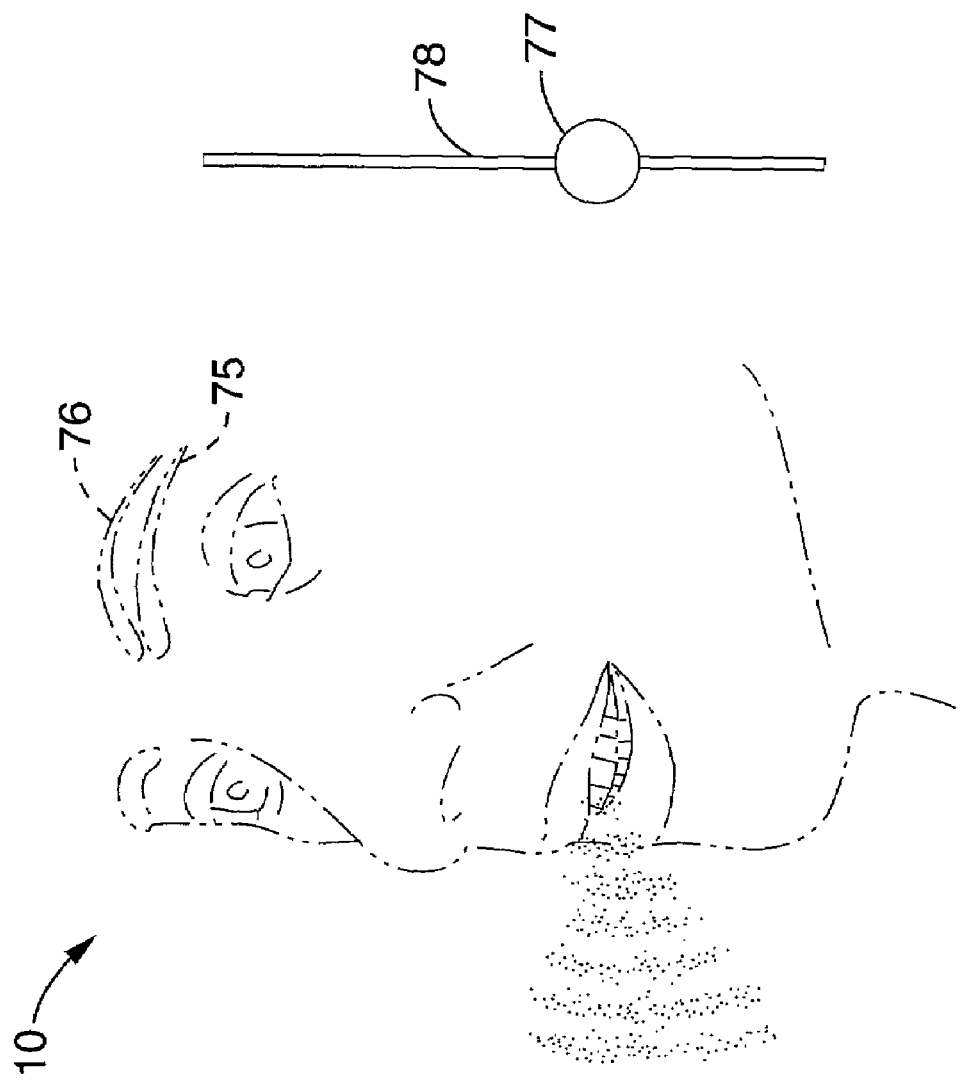
FIG. 24 is a side view of a talking head representing speech pitch according to an aspect of the present invention, shown by the use of eyebrow height manipulation and the movement of a graphic located on a pitch bar.

FIG. 24 illustrates methods of representing pitch within a talking head speech model 10. The height of the eyebrows is shown capable of being modulated between a lower height 75 and an upper height 76 in response to changes in pitch. Evidence exists that a positive correlation exists between pitch and eyebrow height, therefore the amplified modulation of eyebrow height provides an intuitive pitch indicator. In addition, or alternatively, a pitch graphic such as the position of a pitch ball 77 on a slider bar 78 can represent pitch within the articulated speech segment.

Figure 25:
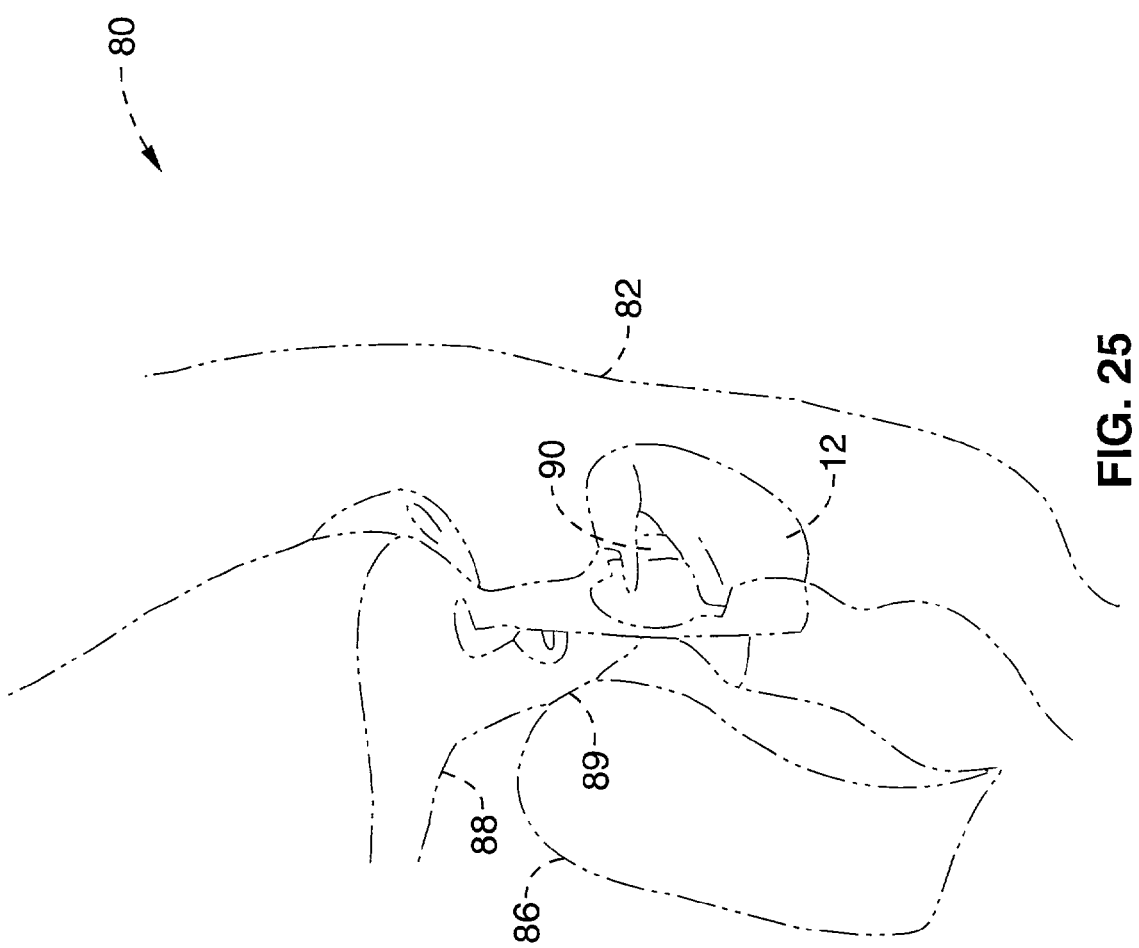
FIG. 25 is a side view of a talking head with a cutaway face portion according to an aspect of the present invention, showing the outline of the tongue and interior mouth surfaces.

FIG. 25 illustrates a method of facilitating the discernment of speech production articulators by increasing the visibility of selected aspects of speech production. It will be appreciated that a number of speech nuances are related to the precise positioning of the tongue in relation to the teeth and palate. The cutaway view 80 of FIG. 25 shows a facial surface 82, that is cut along line 84 to increase the visibility of the tongue 86, palate 88, and teeth 90 within the talking head. Due to the critical need to discern tongue position, tongue 86 is preferably represented in contrasting shades, or colors, and the exterior of the tongue can be highlighted to increase visibility. Furthermore, tongue contact 89 with the surrounding mouth cavity elements is preferably represented by utilizing a form of highlighting proximal to the contact region, such as by shading, or a color change. The cutaway view may be utilized in combination with the various enhancements described above, such as particle-clouds, particle-streams, and so forth. Furthermore, portions of the talking head may be selectively removed, instead of using the bilateral cross-cut shown in FIG. 25.

Figure 26:
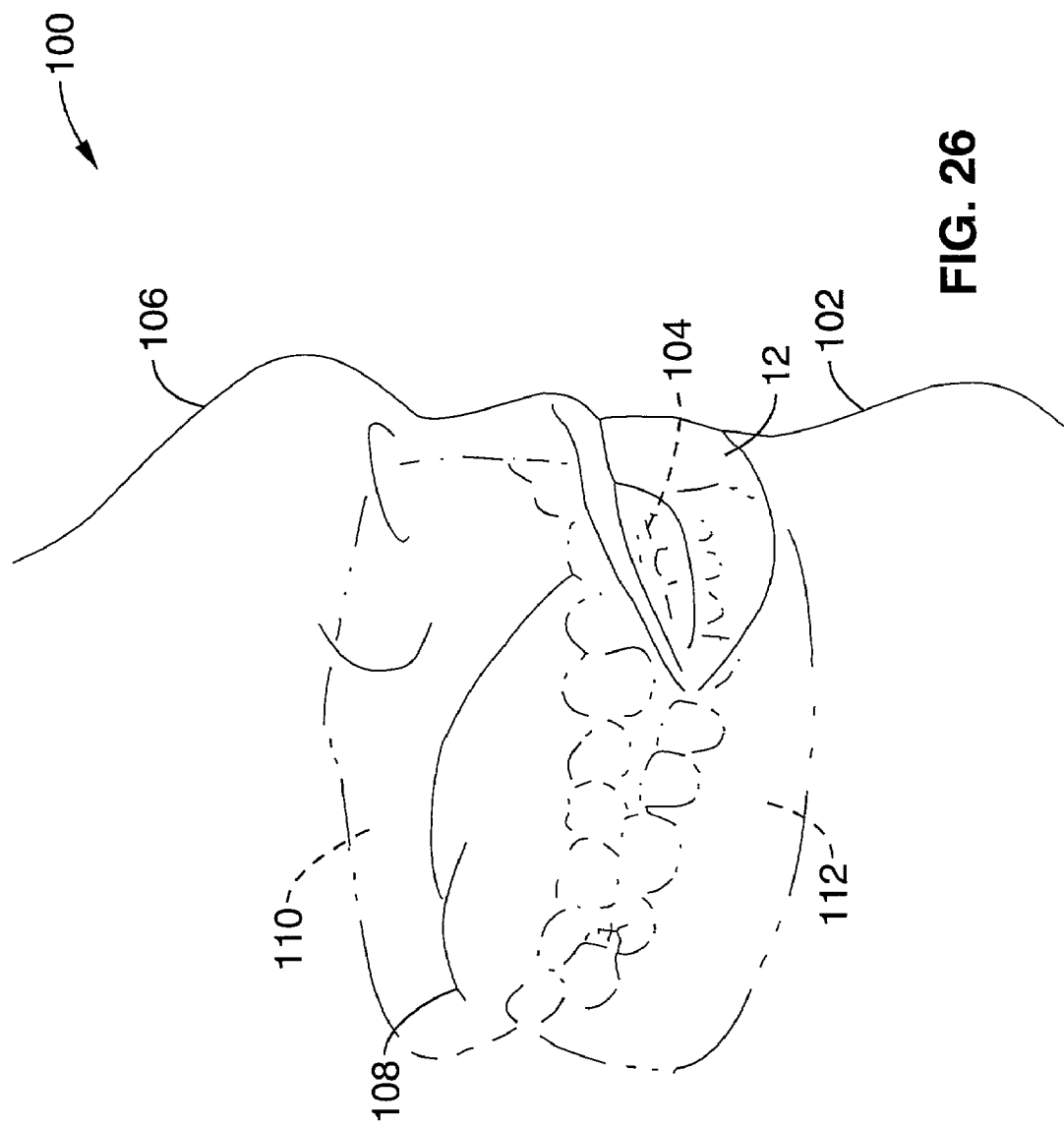
FIG. 26 is a side view of a transparent talking head according to an aspect of the present invention, showing the positioning of the tongue in relation to the interior of the mouth.

FIG. 26 illustrates another method of facilitating the discernment of speech production articulators within a computer-generated talking head 100 shown as a transparent talking head model with mouth 12 and outer surface 102, teeth 104, nose profile 106, tongue 108, palate 110, and gums 112 surrounding teeth 104. The head 100 is displayed with one or more transparent outer surfaces, or portions of the outer surface 102, so that the position of the tongue 108, palate 110, and teeth 104 can be clearly viewed. As in the cutaway view, it is preferable that the exterior of the tongue be highlighted to increase visibility, and that contact between the upper surfaces of the tongue with the palate or teeth be highlighted such as by shading, coloring, or equivalent accentuation.

Figure 29:
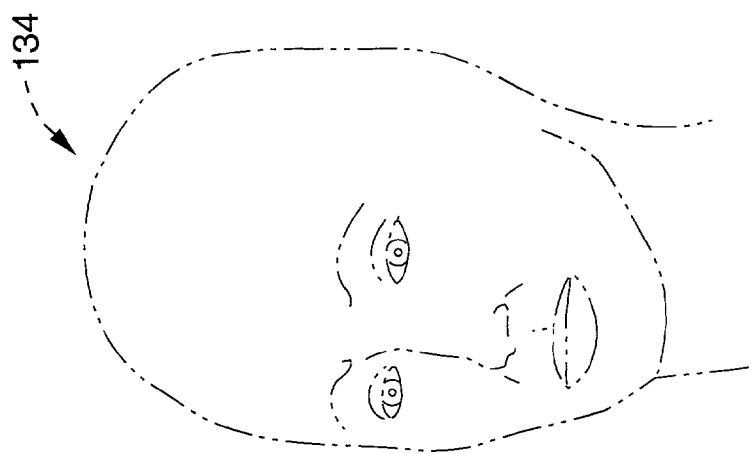
FIG. 29 is a front view of a resultant talking head based on the target face of FIG. 28 according to an aspect of the present invention.
Figure 28:
FIG. 28 is a front view of a target face to be modeled by the talking head according to an aspect of the present invention.
Figure 27:
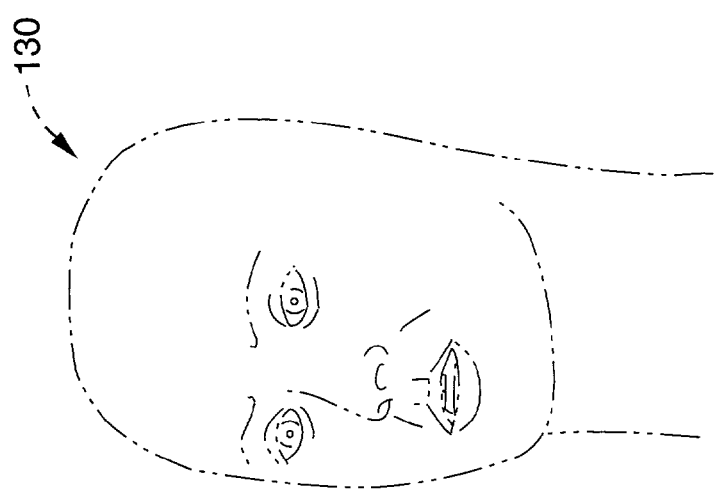
FIG. 27 is a front view of a canonical talking head, as may be displayed according to the present invention.

FIG. 27 through FIG. 29 represent the morphing of a canonical talking head to match a target head model to arrive at a morphed talking head model. FIG. 27 represents the canonical head 130 of the original talking head that is to be morphed to match the target head model 132 of FIG. 28. The result of the morphing process is talking head 134 which is based on the target head of FIG. 29.

The talking head represented in the described figures is largely based on a single canonical face, to which all synthesis, parameter control, coarticulation, and rendering engine are directed. It will be appreciated, however, that the ability to morph the talking head speech model into any arbitrary target model can increase the applicability and apparent relevance of the talking head model to an individual studying speech production with the model. Software has been developed within the present invention to reshape the canonical head to match various target head models, which include both commercial models (e.g. Viewpoint Data Labs) or 3D Cyberware™ laser scans. It will be appreciated that a laser scan of a new target head produces a very high polygon count representation, which complicates animation. Therefore, instead of attempting to animate a high-resolution head, the software within the present invention utilizes data from the target model to reshape the canonical head so that it is altered, morphed, toward the shape of the target head. A target head model is first registered within the system, such as from entry of a laser scan. The facial landmarks on the target head are marked by an operator, and the canonical head is then warped until it assumes as closely as possible the shape of the target head, as determined by the corresponding landmarks within the registered target facial model, with the additional constraint that the landmarks of the canonical face move to positions corresponding to those on the target face. All the polygons, such as triangles, in the approach which comprise the source and target models are projected on a unit sphere centered at the origin. The models must be convex or star-shaped so that there is at least one point within the model from where all vertices, wireframe nodes, of all triangles are visible, which can be confirmed by a separate vertex-visibility test procedure that checks for this requirement. If a model is non-convex or non-star-shaped, then it may be necessary to ignore or modify these sections of the model, such as by culling specific patches, in order to meet this requirement. In the embodiment shown, the ears, eyes, and lips are handled separately. First, the vertices are translated so that the center point of the model, as determined by the vertex visibility test mentioned above, coincides with the coordinate system origin. The vertices are then moved so that they are at a unit distance from the origin, such that the vertices of the triangles which make up the model are positioned on the surface of the unit sphere. The weighted influence of each landmark is then calculated into each vertex. Then, for each of these source vertices the face of the projected target model is determined for which a given source vertex projects. This provides a homeomorphic mapping (1 to 1 and onto) between source and target data sets, and the morph coordinate of each source vertex can thereby be determined as a barycentric coordinate of the target triangle to which it maps. The mapping guides the final morph between source (canonical head) and target head data sets.

In general, the source and target models may not be in the same coordinate system. This requires that the target model be transformed to ensure that it lies in the same coordinate space as the source. Even if the models are in the same coordinate spaces, it is unlikely that the respective features (lips, eyes, ears, and nose) are aligned with respect to one another. A scattered data interpolation technique may be utilized to aid in aligning the two models with respect to one another. A different technique may be utilized to interpolate polygon patches, associated with non-convex portions which were earlier culled out of the target model. The patches are instead stretched to fit the new boundaries of the culled regions in the morphed target head. The size of the patches culled should be minimized to maintain shape information. The method generates a final complete source model that is duly morphed to the target model, with all patches in place. In outputting the final head topology, all the source polygonal patches are patched together and a single output topology file is generated. The source connectivity is not disturbed and is the same as the original source connectivity.

The morphed head itself provides a one-to-one correspondence between all points on the source model to unique locations on the target model. Absolute coordinate mappings are established by computing barycentric coordinates which are carried back to the original models to compute the locations to which each point on the source model should morph. The final morphing actually transforms the source model to the required target model in a smooth fashion. Subsequent to morphing the canonical head to match the shape of the target model, the texture of the target model can be directly applied to the morphed head.

Figure 30:
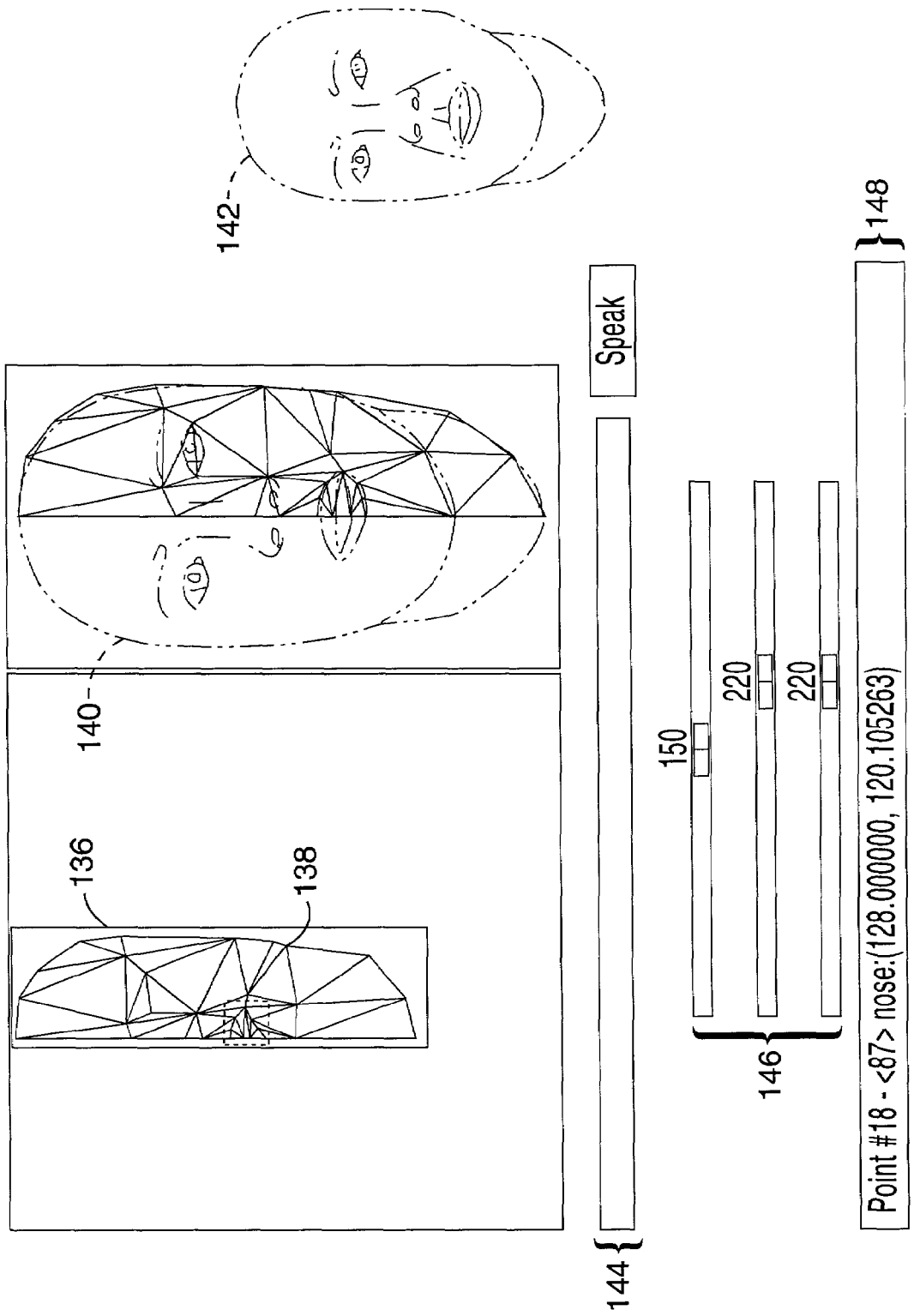
FIG. 30 is front view of a polygon frame upon which a canonical talking head model is shown constructed according to an aspect of the present invention.
Figure 31:
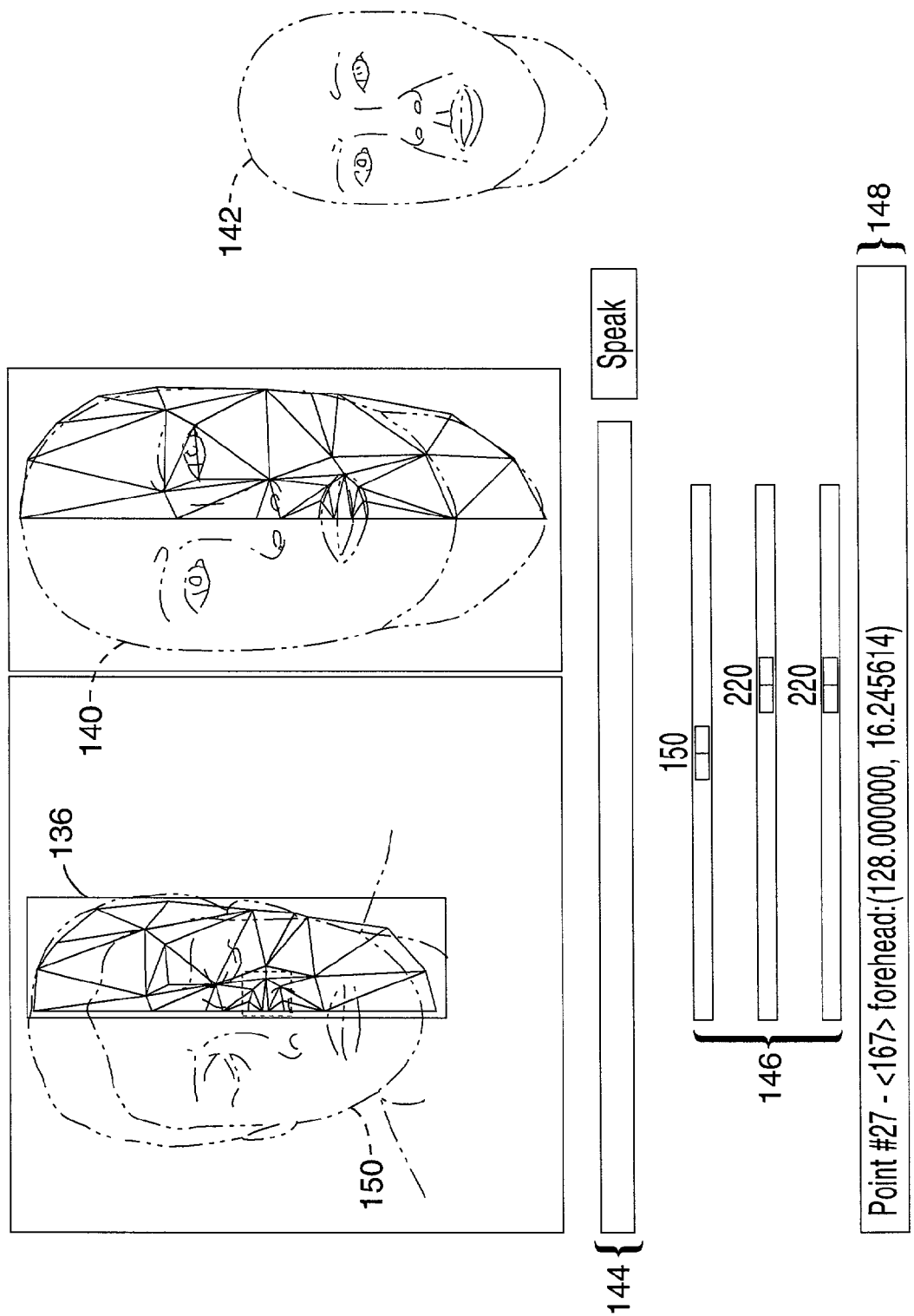
FIG. 31 is a front view of the polygon frame of FIG. 30 being applied over a target face according to an aspect of the present invention, shown prior to the readjustment of the wireframe nodes to match that of the target face.
Figure 32:
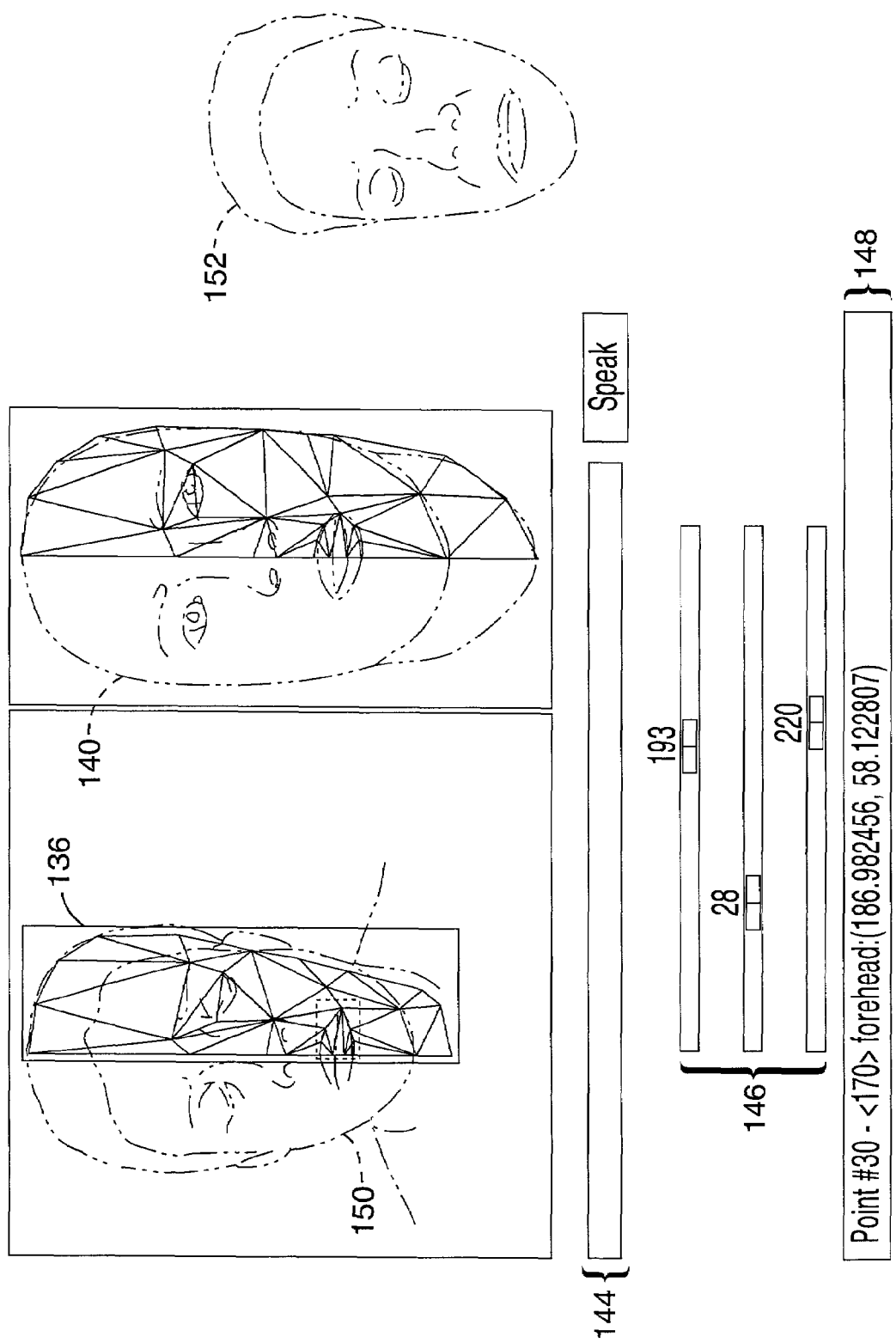
FIG. 32 is a front view of the polygon frame of FIG. 31 applied to a target face according to an aspect of the present invention, shown after the wireframe nodes have been set to match the target face.
Figure 33:
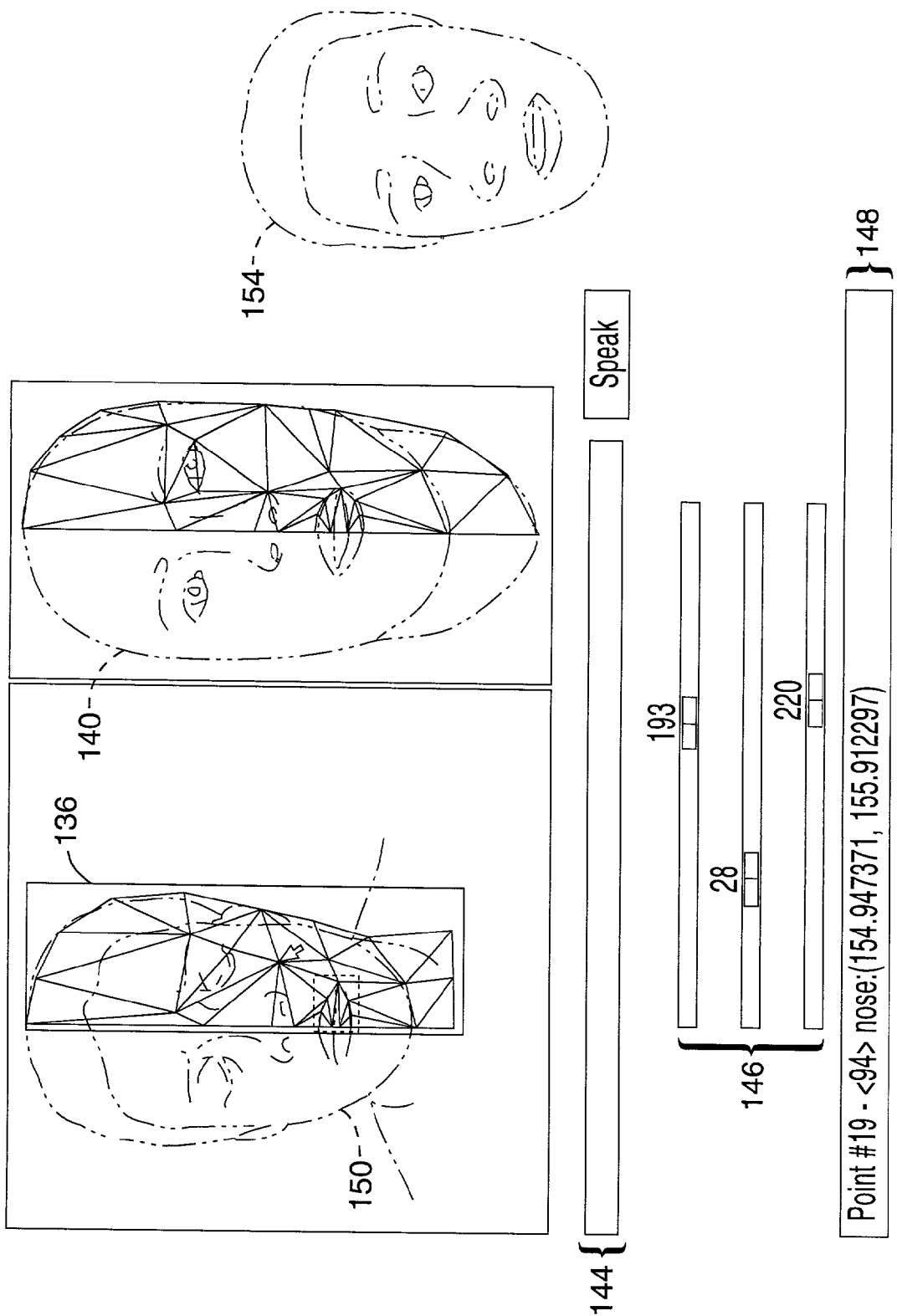
FIG. 33 is a front view of the polygon frame of FIG. 32 being warped according to an aspect of the present invention, shown with the nose of the talking head based on the target face having been broadened.

Another method of morphing the face of a talking head to a target face is represented in FIG. 30 through FIG. 33 wherein the canonical talking head constructed on a polygon frame is morphed to a target face. FIG. 30 illustrates a screen showing a polygon wireframe 136 comprising polygons connected at vertices 138, which are also referred to as wireframe nodes. The use of triangular polygons are represented within the present embodiment, however, it will be appreciated that other forms of polygon frames may be utilized. The wireframe 136 is shown over the canonical face 140 with each of the vertices of the frame lined up with a landmark on the canonical face 140. The resultant talking head model is shown 142 which is illustrative of the canonical face talking head 140 for this figure. A set of inputs and controls preferably allow user selection of speech input 144 and morphing parameters 146, while a status area 148 provides information, such as the position and state of the selected control point vertex. FIG. 31 depicts the wireframe 136 being applied over a target face 150. It will be appreciated that control points denote references to node connections, vertices, between the polygons, which may be moved within the wireframe to control the shape of said wireframe to which a skin region is applied to create the talking head model. The control points 138 of wireframe 136 are then repositioned in the left-hand view to match the facial features, landmarks, of the target face 150 in like manner to that represented by the canonical face 140 in the center panel. FIG. 32 illustrates the completion of moving the vertices in accord with target face 150, wherein the resultant talking head 152 is based on the target face and no longer is based on the canonical face. The talking head 152 based on the target face may then be morphed to alter facial characteristics as desired. FIG. 33 illustrates morphing of talking head 152 by repositioning the wireframe control points corresponding to the nose, so as to widen the nose to arrive at the talking head model 154. It will be appreciated that the textures from the target facial model, including such facial features as skin color, texture, hair, and even affectations such as mustaches and so forth, may be copied from the target face to the resultant talking head.

Accordingly, it will be seen that this invention provides a number of visual enhancements which are applicable to talking head speech models. It should be appreciated that the illustrated embodiments of the invention were provided by way of example on a particular talking head model. In addition, the visual enhancements such as the use of particle-clouds, particle-streams, and so forth were exemplified for use in representing specific voice characteristics of speech, such as plosion and fricatives, while these visual enhancements may additionally, or alternatively be utilized for representing other voice characteristics.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of modeling speech distinctions for a computer-animated talking head which models speech production articulators for a given segment of speech, said talking head having a face portion, comprising:
   displaying a graphical representation of a selected voice characteristic of said speech segment at a position proximal to the face portion of said talking head; and
   displaying a particle-cloud image proximal to the face portion of said talking head in response to a change in a selected voice characteristic within said speech segment.

2. A method as recited in claim 1, wherein said particle-cloud image is displayed by distributing a plurality of displayed particles within a generally circular, oval, or lenticular region.

3. A method as recited in claim 2, wherein said displayed particles comprise small regions which are displayed in a contrasting color or shade which allow them to be visually distinguished from background color.

4. A method as recited in claim 1, wherein said selected voice characteristic comprises plosion, or the presence of stop consonants, within said speech.

5. A method of modeling speech distinctions for a computer-animated talking head which models speech production articulators for a given segment of speech, said talking head having a face portion, comprising:
   displaying a graphical representation of a selected voice characteristic of said speech segment at a position proximal to the face portion of said talking head; and
   displaying a particle-stream graphic image proximal to the face portion of said talking head in response to a change in a selected voice characteristic of said speech segment.

6. A method as recited in claim 5, wherein said particle-stream graphic image is displayed as being angularly dispersed from the mouth portion of said talking head.

7. A method as recited in claim 6, further comprising:
   modulating, in response to changes in a selected voice characteristic of said speech segment, angular dispersion of said particle-stream graphic image;
   wherein said particle-stream graphic image appears to emanate from the mouth of said talking head.

8. A method as recited in claim 5, further comprising:
   displaying said particle-stream graphic image as a plurality of small regions in a contrasting color or shade which allows them to be visually distinguished from the background surrounding said talking head.

9. A method as recited in claim 8, further comprising:
   varying the level of contrast between the particles within said particle-stream graphic image in response to a change in a selected voice characteristic of said speech segment.

10. A method as recited in claim 9, wherein said selected voice characteristic comprises the intensity of fricative energy present in said speech segment.

11. A method as recited in claim 5, further comprising:
    displaying said particle-stream graphic image with the appearance of outward movement from the mouth portion of said talking head.

12. A method as recited in claim 5, wherein said selected voice characteristic comprises the presence of fricatives in said speech segment.

13. A method as recited in claim 5, further comprising:
    displaying said particle-stream graphic image with vertical striations in response to a change in a selected voice characteristic of said speech segment.

14. A method as recited in claim 13, wherein said selected voice characteristic of said speech segment comprises vocal cord vibration.

15. A method of modeling speech distinctions for a computer-animated talking head which models speech production articulators for a given segment of speech, said talking head having a face portion, comprising:

displaying a graphical representation of a selected voice characteristic of said speech segment at a position proximal to the face portion of said talking head;

wherein said talking head has a nose portion; and displaying concentric outline images proximal to the nose of portion of said talking head in response to a change in a selected voice characteristic of said speech segment.

16. A method as recited in claim 15, wherein said voice characteristic comprises nasality.

17. A method as recited in claim 15, wherein said concentric outline images comprise concentric substantially triangular images.

* * * * *

UNITED STATES PATENT AND TRADEMARK OFFICE
CERTIFICATE OF CORRECTION

PATENT NO. : 7,225,129 B2
APPLICATION NO. : 09/960248
DATED : May 29, 2007
INVENTOR(S) : Dominic W. Massaro and Michael M. Cohen It is certified that error appears in the above-identified patent and that said Letters Patent is hereby corrected as shown below:

On the Title page, item (54); the Title should read: VISUAL DISPLAY METHODS FOR --USE-- IN COMPUTER-ANIMATED SPEECH PRODUCTION MODELS.

In the list of inventors, item (75); please omit JONAS BESKOW, Stockholm (SE).

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,225,129 B2 Page 1 of 1
APPLICATION NO. : 09/960248
DATED : May 29, 2007
INVENTOR(S) : Dominic W. Massaro and Michael M. Cohen It is certified that error appears in the above-identified patent and that said Letters Patent is hereby corrected as shown below:

On the Title page, item (54) and Column 1, lines 1-3; the Title should read: VISUAL DISPLAY METHODS FOR --USE-- IN COMPUTER-ANIMATED SPEECH PRODUCTION MODELS.

In the list of inventors, item (75); please omit JONAS BESKOW, Stockholm (SE).

This certificate supersedes the Certificate of Correction issued May 20, 2008.

Signed and Sealed this

Seventeenth Day of June, 2008

JON W. DUDAS
*Director of the United States Patent and Trademark Office*